Patented Aug. 31, 1948

2,448,158

UNITED STATES PATENT OFFICE 2,448,158

GREEN TETRAKISAZO DYES

Chiles E. Sparks, Wilmington, Del., James W. Libby, Jr., St. Matthews, Ky., and Joseph H. Trepagnier, Wilmington, Del., assignors to E. I. du Pont de Nemours & Company, Wilmington, Del., a corporation of Delaware No Drawing. Application January 4, 1945, Serial No. 571,362

4 Claims. (Cl. 260—159)

This invention relates to new tetrakisazo dyes which are represented in general by the formula A←X→Y→Z→B, the symbols of which are hereinafter fully described. The dyes of the present invention are suitable for dyeing cotton, regenerated cellulose and similar fibers in shades of green by direct dyeing methods. Treatment of the dyeings with formaldehyde results in dyeings in clear shades of green having exceptional washing fastness and excellent discharge properties.

Various dyes are known which produce bright green dyeings on cotton and similar fibers by direct dyeing methods. While the methods of producing these dyeings are economical, the dyeings do not meet the highest standards with respect to washing fastness. Green dyeings have also been produced on cotton with diazo dyes which are developed on the fiber. These dyeings generally have excellent washing fastness but the processes are relatively more costly to operate than direct dyeing methods by reason of the necessity of using a number of dyeing operations in their production. It was therefore desirable to provide dyes which would economically produce bright clear dyeings in shades of green having exceptionally good washing fastness and other good properties generally desired in dyed fabrics and to provide simple and economical methods for making such dyeings.

In the formula representing the dyes of the present invention the symbol A represents 1,3-dihydroxy benzene.

The symbol X is an aryl diamine of the kind represented by the formulae

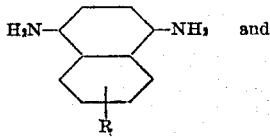 and 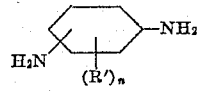

wherein the amino groups in the phenylene nucleus are para or meta to each other, R is from the group consisting of hydrogen and sulfonic acid, R' is from the group consisting of hydrogen, sulfonic acid, methyl and methoxy and $n$ is an integer not greater than 2. Where there is more than one group on the benzene nucleus, the groups may be alike such as di-methyl, di-sulpho and di-methoxy, or different from each other such as methyl-methoxy (—$CH_3$ and —$OCH_3$), methyl-sulfo (—$CH_3$ and —$SO_3H$) and methoxy-sulfo (—$OCH_3$ and —$SO_3H$). One of the amino groups of the intermediates from which the X component is formed is acylated when the initial couplings are made but this acylamine group is eventually hydrolyzed to amino before the coupling is made with the component A.

The component Y is a 1-amino-2-alkoxy-sulfonic acid represented by the formula

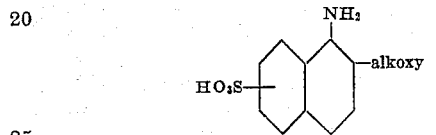

wherein alkoxy has 1 to 3 carbons and the sulfonic acid group is in the 6 or 7 position.

The component Z is an (amino-benzoylamino)-5-naphthol-7-sulfonic acid represented by the formula

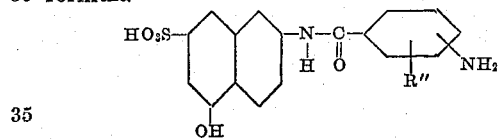

wherein the primary amino group is either para or meta to the —CO— group and R'' represents hydrogen, alkyl or alkoxy.

The component B is a 5-phenyl-pyrazolone in which the phenyl group may or may not carry a sulfo group and to which alkyl, alkoxy or halogen groups up to two members of the group may be attached. The type is represented by the formula

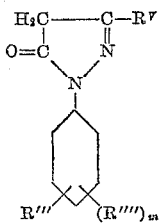

wherein R''' is one of the group consisting of hydrogen and sulfonic acid, R'''' is from the group consisting of hydrogen, halogen, alkyl and alkoxy, m is an integer not greater than 2 and R$^V$ is alkyl or carboxyl. The R'''' groups may be alike or different. When R'' or R'''' in the above formulae are alkyl or alkoxy the number of carbons in these groups is not in excess of 6. The halogen groups may be chlorine or bromine. The dyes represented by the general formula contain at least 2 but not more than 4 sulfonic acid groups.

In making the dyes a compound X, in which one of the primary amino groups is blocked by mono-acylation thereby forming a compound $a$—X, is diazotized and coupled with a compound Y to form a monazo compound $a$—X→Y wherein the symbol, $a$, represents the acyl group. This monazo compound is diazotized and coupled with a compound Z. The product of this coupling is a disazo compound represented by the general formula $a$—X→Y→Z. This diazo compound is then diazotized and coupled with an azo dye coupling component B to form a trisazo compound $a$—X→Y→Z→B. The trisazo compound is then treated to hydrolyze the acylamino group to amino, thereby producing a compound

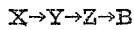

The diazo of this trisazo compound is then coupled with meta-dihydroxy benzene. The components are selected from the described classes of components so that the resulting tetrakisazo compound will contain 2, 3 or 4 sulfonic acid groups. The products are water soluble.

In making dyeings, the resulting compound A←X→Y→Z→B is dissolved in water to make a dyebath. Direct dyeings in shades of green are made in well known manner by entering a suitable fabric in the bath. After the direct dyeing is made, it is treated with formaldehyde whereupon a bright green dyeing having excellent fastness to washing and discharge properties is produced. Both the direct and formaldehyde treated dyeing may be varied by treating with a water solution of a copper salt.

The invention will be more fully set forth in the following more detailed description which includes examples that are given as illustrative embodiments of the invention and not as limitations thereof. Parts are expressed in parts by weight unless otherwise noted.

*Example 1*

A slurry consisting of 68 parts of 4-formyl-amino-aniline and 500 parts of water is cooled to 0°–5° C. with ice, 46 parts of 100% hydrochloric acid are added as a 30% solution and the mixture is stirred until a complete solution is formed.

The compound is diazotized by adding 34.5 parts of 100% sodium nitrite as a 30% solution. A slight excess of nitrite and a temperature of 0°–5° C. are maintained. The diazotization is completed in about fifteen minutes.

A slurry consisting of 127 parts of 1-amino-2-methoxy-naphthalene-6-sulfonic acid in 1000 parts of water is dissolved by adding 170 parts of sodium bicarbonate. This solution is cooled to 0° to 2° C.

Couple by slowly adding the diazo to the alkaline coupling solution over one-half hour. Stir an additional two hours to complete the coupling. Salt 5% with sodium chloride and filter out the monazo compound thus formed.

Stir to a smooth slurry the filter cake of monazo compound with 1000 parts of water and 250 parts of sodium chloride. Cool to 0° to 2° C. and add 46 parts of 100% hydrochloric acid as a 30% solution. Add 34.5 parts of 100% sodium nitrite as a 30% solution. Diazotize for two hours at 5°–10° C. At the end of this time, filter off the solids and reslurry the press cake of diazo compound in 1000 parts of water and cool to 0° to 2° C. with ice.

Dissolve 178 parts of 2-(3'-amino-benzoyl-amino)-5-naphthol-7-sulfonic acid in 1500 parts of water by adding approximately 8.5 parts of 100% ammonia. Add 133 parts of sodium carbonate and 900 parts of pyridine. Cool to 0° C.

Slowly add the slurry of diazo compound to the alkaline coupling solution over a period of one-half hour. Stir an additional two hours to complete the coupling. Salt 10% with sodium chloride and filter off the disazo compound thus formed. Wash the filter cake with 500 parts of 20% brine.

Stir the press cake of disazo compound in 1500 parts of water. Cool to 0° C. with ice. Add 46 parts of 100% hydrochloric and 34.5 parts of 100% sodium nitrite both as 30% solutions. Maintain an excess of nitrite for fifteen minutes.

Dissolve 162.5 parts of 1-(2',5'-dichlor-4'-sulfophenyl)-3-methyl-5-pyrazolone in 500 parts of water by adding 185 parts of sodium carbonate. Cool to 0° C.

Slowly add the slurry of diazotized disazo compound to the alkaline coupling solution over a period of one-half hour. After the coupling is complete, hydrolyze the formyl group by adding 90 parts of sodium hydroxide and heating to 80° C. Maintain a temperature of 80° C. for five minutes. Cool with ice to 50° C. and add approximately 98 parts of 100% hydrochloric acid to give a negative test on Clayton Yellow paper. Salt the dye suspension 20% and filter off the trisazo base thus formed.

Diazotize the latter base by slurrying the filter cake thereof in 2000 parts of water, cooling to 5° C. and adding 73 parts of 100% hydrochloric acid and 34.5 parts of 100% sodium nitrite, both as 30% solutions. Maintain a distinct excess of nitrite for one-half hour.

Dissolve 68 parts of 1,3-dihydroxy benzene in 250 parts of water. Ice to 0° C. Add 133 parts of sodium carbonate. Add the diazo solution slowly over a one-half-hour period and then stir for two hours.

Heat the suspension of tetrakisazo compound thus produced to 60° C. and salt 20% with sodium chloride. Add slowly approximately 38 parts of 100% hydrochloric acid until the dye slurry is acid to Congo red paper (pH=2.0). Filter off the tetrakisazo compound and dry in an oven at 85° C. The dry powder is dark and has a metallic lustre.

The compound is represented by the formula

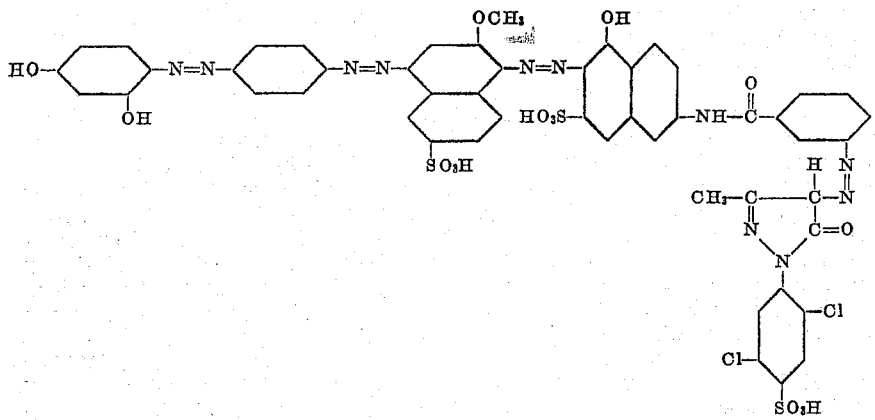

The dye may be dyed and aftertreated as follows:

Dissolve 0.2 gram of the above described product in 50 ml. water at 190°–200° F., adding 0.4 gram of sodium carbonate to assist the solution. Dilute with stirring to a total volume of 500 ml. with water at approximately 160° F. Add 40 ml. of a 10% solution of Glauber's salt. Wet out a 10-gram piece of rayon with water, squeeze partially dry, and enter this into the dye bath. Raise the temperature of the dye bath to 180°–190° F. in the course of fifteen minutes and hold the dyebath at 180°–190° F. for one hour. Stir the dyeings at frequent intervals. At the end of one hour, remove the dyeing and rinse in cold water. The dyeing is a green shade.

The direct dyeing is aftertreated in a fresh bath by adding the rinsed dyeing from the above operation to 500 ml. of water at 130°–150° F. and then adding approximately 10 ml. of 10% formaldehyde (25 ml. of approximately 37% formaldehyde by weight, diluted to 250 cc. with water). Hold the dyeing in the bath at this temperature for twenty minutes, and then remove the dyeing, rinse and dry.

An alternative after-treating process, which is the preferred procedure because of its economy and ease of application, is carried out at the end of the dyeing period by adding 10 ml. of 10% formaldehyde to the dyebath at bath temperature, and then removing, rinsing and drying the dyeing after twenty minutes' treatment.

A dyeing with a bright green shade is obtained which has excellent fastness to washing and yields white discharges.

As the first component, an equivalent amount of 3-formylamino-aniline can be used in the foregoing example instead of 4-formylamino-aniline with similar effect; and as the second or Y component, an equivalent of any 6- or 7-monosulfonic acid of 1-amino-2-methoxy-naphthalene, or a corresponding 2-ethoxy derivative can be used, such as 1-amino-2-ethoxy-naphthalene-7-sulfonic acid or 1-amino-2-methoxy-naphthalene-7-sulfonic acid.

Similar results are obtained by using an equivalent of 1-amino-2-n-propoxynaphthalene-6-sulfonic acid in the foregoing process instead of 1-amino-2-methoxy-naphthalene-6-sulfonic acid.

*Example 2*

Slurry 140 parts of 4-acetylamino-1-aminonaphthalene-6-sulfonic acid in 1000 parts of water. Cool to 10° C. and add 36.5 parts of 100% hydrochloric acid as a 30% solution. Add 34.5 parts of 100% sodium nitrite as a 30% solution over 5–10 minutes and diazotize for one-half hour at 14°–15° C.

Dissolve 127 parts of 1-amino-2-methoxynaphthalene-6-sulfonic acid in an alkaline solution consisting of 1000 parts of water and 170 parts of sodium bicarbonate. Cool the solution to 0° C. and slowly add the diazo slurry to the alkaline coupling solution over one-half hour. Stir the mixture for two hours and then salt the above-prepared first combination 15%.

Diazotize the monazo compound thus formed at 8° C. by adding 73 parts of 100% hydrochloric acid and 34.5 parts of 100% sodium nitrite as 30% solutions. Diazotize for one hour.

Dissolve 178 parts of 2-(3'-amino-benzoylamino)-5-naphthol-7-sulfonic acid in an alkaline solution composed of 1000 parts of water and 8.5 parts of 100% ammonia. Ice this solution to 0° C. and add 133 parts of sodium carbonate and 900 parts of pyridine.

Mix the diazo of the monazo compound and the alkaline coupling solution by slowly adding the diazo solution over a period of one-half hour and then stir the mixture an additional two hours. Salt 10% with sodium chloride, filter off the disazo compound and wash the filter cake with 100 parts of 20% brine.

Slurry the filter cake of disazo compound in 1000 parts of water and cool to 5° C. Diazotize by adding 46 parts of 100% hydrochloric acid and 34.5 parts of 100% sodium nitrite. Maintain the diazotization mixture at a temperature of 10° C. and with an excess of nitrite for one and one-quarter hours.

Dissolve 162.5 parts of 1-(2',5'-dichloro-4'-sulfophenyl)-3-methyl-5-pyrazolone in an alkaline solution composed of 500 parts of water and 185 parts of sodium carbonate and cool the solution to 0° C.

Mix the diazo slurry and the solution of alkaline coupling component by slowly adding the diazo slurry thereto over a period of one-half hour. After the coupling is complete, hydrolyze the acetyl group by adding 120 parts of sodium hydroxide and heating to 90° C. This requires about five minutes' heating at 90° C. Cool the resulting mixture with ice to 50° C. and add approximately 125 parts of 100% hydrochloric acid to give a negative test on Clayton Yellow paper. Then recover the trisazo compound by salting the dye suspension 20% and filtering.

Diazotize the resulting hydrolyzed base by slurrying the filter cake in 2000 parts of water, cooling to 5° C. and adding 73 parts of 100% hydrochloric acid and 34.5 parts of 100% sodium nitrite, both as a 30% solution. Maintain a temperature of 10° C. and a distinct excess of nitrite for one and one-half hours.

Dissolve 55 parts of 1,3-dihydroxy benzene in 250 parts of water, ice to 0° C. and then make alkaline by adding 133 parts of sodium carbonate. Mix the solution of coupling component and the diazo by slowly adding the diazo to the solution of coupling component over a one-half-hour period and then stir for two hours.

Heat the dye suspension thus formed to 60° C., salt 20% with sodium chloride and then add 38 parts of 100% hydrochloric acid slowly until the dye suspension is acid to Congo red paper (pH=2.0). Filter and dry at 80° C. The dry tetrakisazo compound is a dark powder having a metallic lustre.

The compound in its acid form is represented by the formula

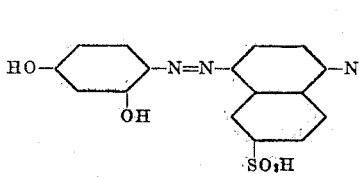
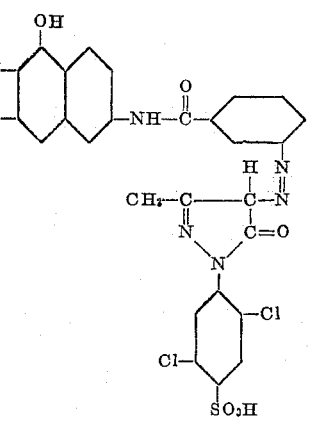

When dyed and aftertreated in a manner analogous to that described in Example 1, the product yields dyeings in clear green shades having excellent fastness and yielding white discharges.

Except as noted, the following Examples 3 to 5 were carried out the same as Example 1.

have ethoxy, propoxy, butoxy, pentoxy or hexoxy instead of methoxy attached to the benzene nucleus, 2-(3'-amino-4'-methylbenzoylamino)-5-naphthol-7-sulfonic acid and the corresponding ethyl, propyl, butyl, pentyl and hexyl derivatives.

As other illustrations of B components which may be used are 1-phenyl-5-pyrazolone-3-carboxylic acid, 1-(3'-methylphenyl)-3-methyl-5-pyrazolone, 1-(3'-sulfophenyl)-3-methyl-5-pyrazolone, 1-(2'-chloro-5'-sulfophenyl)-3-methyl-5-pyrazolone, 1-(4'-chloro-3'-sulfophenyl)-3-methyl-5-pyrazolone, 1-(4'-methyl-2'-sulfophenyl)-3-methyl-5-pyrazolone, 1-(4'-sulfophenyl)-5-pyrazolone-3-carboxylic acid, 1-(4'-ethoxyphenyl)-3-methyl-5-pyrazolone, 1-(3'-sulfophenyl)-5-pyrazolone-3-carboxylic acid, 1-(4'-n-propylphenyl)-3-methyl-5-pyrazolone, 1-(4'-n-propoxyphenyl)-3-methyl-5-pyrazolone, 1-(2',5'-dimethoxyphenyl)-3-methyl-5-pyrazolone, 1-(2'-chloro-3'-sulfophenyl)-3-methyl-5-pyrazolone and 1-(3',4'-dichlorophenyl)-3-methyl-5-pyrazolone.

The preferred types of products are those in which the A component is 1,3-dihydroxy benzene and the Z component is 2-(3'-amino-benzoylamino)-5-naphthol-7-sulfonic acid.

Dyeings on cotton can be improved in light fastness by an after-treatment with a soluble copper salt. This treatment may be applied sim-

| Example | A Component | X Component | Y Component | Z Component | B Component |
|---|---|---|---|---|---|
| 3* | 1,3-dihydroxy benzene | 4-formylaminoaniline | 1-amino-2-methoxynaphthalene-6-sulfonic acid. | 2-(3'-aminobenzoylamino)-5-naphthol-7-sulfonic acid. | 1-(4'-sulfophenyl)-3-methyl-5-pyrazolone. |
| 4* | 1,3-dihydroxy benzene | 4-formylaminoaniline | 1-amino-2-methoxynaphthalene-6-sulfonic acid. | 2-(3'-aminobenzoylamino)-5-naphthol-7-sulfonic acid. | 1-phenyl-3-methyl-5-pyrazolone. |
| 5* | 1,3-dihydroxy benzene | 4-(acetylamino)-1-aminonaphthalene-7-sulfonic acid. | 1-amino-2-methoxynaphthalene-6-sulfonic acid. | 2-(3'-aminobenzoylamino)-5-naphthol-7-sulfonic acid. | 1-phenyl-3-methyl-5-pyrazolone. |

*Shade of aftertreated dyeing: green.

As illustrations of other components which may be used as X components for making dyes having properties similar to those described are 3-acetylamino-aniline, 4-oxalylamino-3-sulfo-aniline, 4-oxalylamino-3-methylaniline, 4-oxalylamino-2-methoxyaniline, 4-oxalylamino-2-methoxy-5-methylaniline, 4-oxalylamino-2,5-dimethylaniline, 4-acetylamino-1-aminonaphthalene, 4-formylamino-2,5-dimethoxyaniline, 4-oxalylamino-5-sulfo-2-methylaniline and 4-formylamino-5-sulfo-2-methoxyaniline.

As other illustrations of Z components which may be used are 2-(4'-aminobenzoylamino)-5-naphthol-7-sulfonic acid, 2-(3'-amino-4'-methoxy-benzoylamino)-5-naphthol-7-sulfonic acid, the corresponding naphthol sulfonic acids which ilarly to the formaldehyde treatment by substituting a soluble copper salt in suitable amount for formaldehyde or by adding the soluble copper salt to the formaldehyde bath after the formaldehyde treatment is completed.

The compounds of the present invention provide dyeings which are characterized by excellent washing fastness in bright shades and which do not stain undyed fiber that is in contact with the dyed fiber during washing. In general the washing fastness of formaldehyde-treated dyeings is equal to the washing fastness of diazo colors of similar shade and it is sometimes superior. Thus dyeings of at least equal fastness can be obtained with the dyes of the present invention with relatively moderate effort and at moderate operational expense. The dyeings made with the present invention do not change materially in shade during the treatment with formaldehyde and they are much more easily manipulated than the diazo colors which change shade materially upon being developed.

From the foregoing disclosure it will be recognized that the invention is susceptible of modification without departing from the spirit and scope thereof and it is to be understood that the invention is not restricted to the specific illustrations thereof herein set forth.

We claim:

1. A tetrakisazo compound which in its acid form is represented by the formula

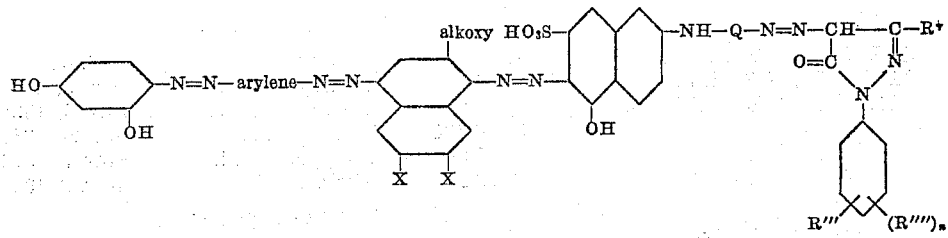

in which one X is hydrogen and the other is sulfonic acid; alkoxy has 1 to 3 carbons; the arylene radical is represented by a formula of the group

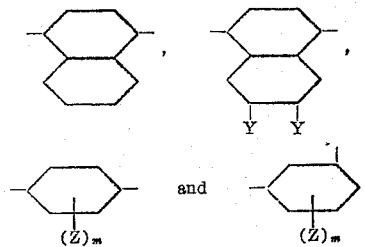

wherein one Y is hydrogen and the other is sulfonic acid; Z is one of the group consisting of hydrogen, sulfonic acid, methyl and methoxy; $m$ is 1 to 2 and the free bonds represent the positions of attachment of azo groups; Q is one of the radicals

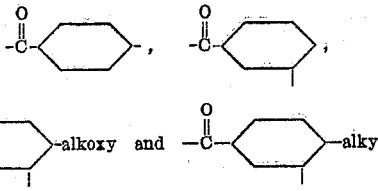

where alkyl and alkoxy have 1 to 6 carbons and each free bond on the benzene rings represents the position of attachment of an azo group; $R'''$ is one of the group consisting of hydrogen and sulfonic acid; $R''''$ is from the group consisting of hydrogen, chlorine, bromine, alkyl having not more than 3 carbons and alkoxy having not more than 3 carbons, and $n$ is an integer not greater than 2; and $R^v$ is one of the group consisting of methyl and carboxy; said dyestuff having 2 to 4 sulfonic acid groups.

2. The compound represented by the formula

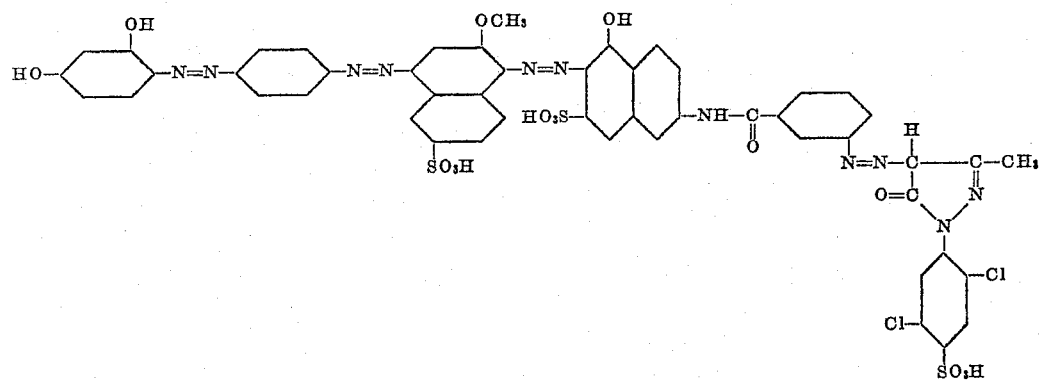

3. The compound represented by the formula

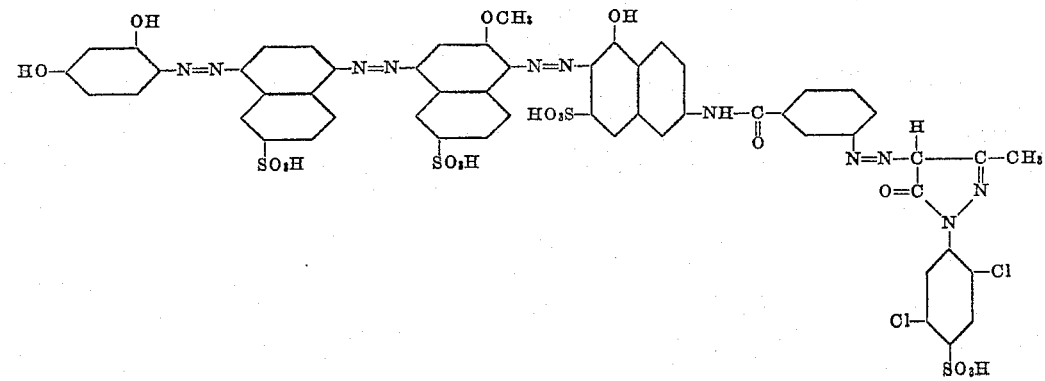

4. The compound represented by the formula
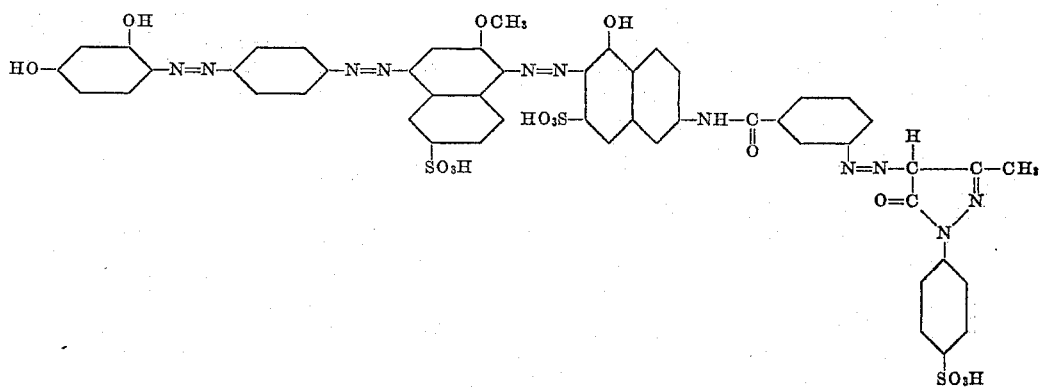
CHILES E. SPARKS.
JAMES W. LIBBY, Jr.
JOSEPH H. TREPAGNIER.
REFERENCES CITED
The following references are of record in the file of this patent:
UNITED STATES PATENTS
| Number | Name | Date |
|---|---|---|
| 1,730,207 | Hentrich et al. | Oct. 1, 1929 |
| 1,736,905 | Fellmer | Nov. 26, 1929 |
| 1,784,617 | Woodward | Dec. 9, 1930 |
| 1,965,201 | Murphy | July 3, 1934 |
| 2,018,764 | Paine | Oct. 29, 1935 |
| Re. 22,286 | Rossander et al. | Mar. 9, 1943 |
| Re. 22,287 | Sparks et al. | Mar. 9, 1943 |
FOREIGN PATENTS
| Number | Country | Date |
|---|---|---|
| 622,974 | France | Mar. 8, 1927 |
| 469,288 | Germany | Dec. 8, 1928 |